United States Patent
Batra et al.

(10) Patent No.: US 7,272,358 B2
(45) Date of Patent: Sep. 18, 2007

(54) CHANNELIZATION SCHEME FOR WIRELESS LOCAL AREA NETWORKS

(75) Inventors: Anuj Batra, Dallas, TX (US); Kofi Anim-Appiah, Allen, TX (US); Matthew B. Shoemake, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 379 days.

(21) Appl. No.: 10/210,626

(22) Filed: Jul. 31, 2002

(65) Prior Publication Data

US 2003/0171115 A1   Sep. 11, 2003

Related U.S. Application Data

(60) Provisional application No. 60/362,418, filed on Mar. 7, 2002.

(51) Int. Cl.
*H04B 7/00* (2006.01)

(52) U.S. Cl. .............. 455/41.2; 455/434; 455/524; 455/526; 455/561; 455/42

(58) Field of Classification Search .......... 455/41.2, 455/434, 524, 561, 526, 42
See application file for complete search history.

(56) References Cited

U.S. PATENT DOCUMENTS

| | | | | |
|---|---|---|---|---|
| 5,825,811 | A * | 10/1998 | Souissi | 375/133 |
| 5,923,702 | A * | 7/1999 | Brenner et al. | 375/133 |
| 6,345,066 | B1 * | 2/2002 | Haartsen | 375/130 |
| 6,487,264 | B1 * | 11/2002 | Alley et al. | 375/361 |
| 6,985,461 | B2 * | 1/2006 | Singh | 370/329 |
| 2001/0010689 | A1 * | 8/2001 | Awater et al. | 370/344 |
| 2002/0137461 | A1 * | 9/2002 | Grundvig et al. | 455/41 |
| 2002/0193072 | A1 * | 12/2002 | Alinikula et al. | 455/41 |
| 2003/0023761 | A1 * | 1/2003 | Jeansonne et al. | 709/250 |
| 2003/0060222 | A1 * | 3/2003 | Rune | 455/517 |
| 2003/0174690 | A1 * | 9/2003 | Benveniste | 370/350 |
| 2003/0181221 | A1 * | 9/2003 | Nguyen | 455/562.1 |
| 2004/0004951 | A1 * | 1/2004 | Zuniga et al. | 370/338 |
| 2004/0098597 | A1 * | 5/2004 | Giobbi | 713/185 |
| 2005/0227661 | A1 * | 10/2005 | Ginzburg | 455/277.2 |
| 2005/0243860 | A1 * | 11/2005 | Chen et al. | 370/465 |

* cited by examiner

*Primary Examiner*—George Eng
*Assistant Examiner*—Huy Phan
(74) *Attorney, Agent, or Firm*—Steven A. Shaw; W. James Brady; Frederick J. Telecky, Jr.

(57) ABSTRACT

A four channel wireless network channelization scheme is described that is particularly usable in the ISM frequency band between 2400 MHz and 2483.5 MHz. The preferred channelization scheme permits access points to be set at one of four frequencies in the ISM band, not three as taught by the IEEE 802.11b standard. This channelization scheme takes advantage of the fact that only 20 MHz is typically needed between adjacent access point channels, not 25 MHz as is taught by the 802.11b standard. With four channels to choose from, a higher density of access points can be located thereby accommodating a higher density of users. The four channels preferably are 2407, 2427, 2447 and 2467 MHz. With this selection of channel frequencies and given the current FCC regulations, all four channels can be used to transmit an equal amount of power.

20 Claims, 1 Drawing Sheet

CHANNELIZATION SCHEME FOR WIRELESS LOCAL AREA NETWORKS

CROSS-REFERENCE TO RELATED APPLICATIONS

This disclosure claims priority to provisional application entitled "New Channelization Scheme for IEEE 802.11g," filed on Mar. 7, 2002, Ser. No. 60/362,418, incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention generally relates to wireless communications. More particularly, the invention relates to a channelization scheme for a wireless network. Still more particularly, the invention relates to a four channel channelization scheme for an IEEE 802.11 wireless network operating in the Industrial, Scientific, Medical frequency band between 2400 and 2483.5 MHz.

2. Background Information

Initially, computers were most typically used in a standalone manner. It is now commonplace for computers and other types of electronic devices to communicate with each other. The ability for computers to communicate with one another has lead to the creation of small networks comprising two or three computers to vast networks comprising hundreds or even thousands of computers. Networks thus can be set up to provide a wide assortment of capabilities. For example, networked computers can be established so as to permit each computer to share a centralized mass storage device or printer. Further, networks enable electronic mail and numerous other types of services. Networks can be established in a wired configuration in which each entity on the network has a direct physical electrical connection to the network. More recently, wireless technology has increased in popularity to provide wireless data communications to the entities on the network.

Wireless networks are defined in various standards. The IEEE 802.11 standard, for example, permits a wireless local area network (WLAN) to be set up in a business or residence. One or more "access points" are located at predetermined locations and are connected via cables to servers and other types of network equipment. Each access point also has a wireless radio capability to permit wireless communications with nearby wireless-enabled devices such as desktop computers, notebooks, handheld devices, and the like. Each access point has a certain range and a wireless-enabled device must be within that range for effective communications to occur. Through the access points, the wireless-enabled devices gain access to the network for data and file transfers, email, etc.

An exemplary configuration of a WLAN is shown in FIG. 1. As shown, configuration 10 includes four access points 12, 14, 16, and 18. Each access point is represented in FIG. 1 as a point, but is actually an electronic device as would be known by those of ordinary skill in the art. Each access point has a wireless coverage area. As shown, access point 12 has a coverage area 13 and, similarly, access points 14, 16 and 18 have coverage areas 15, 17 and 19, respectively. Preferably, adjacent coverage areas overlap geographically, at least slightly, to prevent dead or silent areas in which connectivity to the WLAN is lost.

The 802.11 standard noted above has spawned a number of task groups currently designated by the letters a through i. These task groups are involved with advancing the state of wireless technology in various ways. For example, the standard created by the b task group (referred to as the "802.11b standard") specifies the use of the Industrial, Scientific, and Medical (ISM) frequency band. The ISM band is located between 2400 megahertz (MHz) and 2483.5 MHz. The 802.11b standard defines 14 channels designated as channels 1 through 14. Channel 1 is at 2412 MHz and the remaining channels 2-14 are spaced 5 MHz apart. Thus, channel 2 is at 2417 MHz, channel 3 is at 2422 MHz, and so on. Although 14 channels are defined in the 802.11b standard, the standard permits only channels 1 through 11 to be used in the U.S.

The radio in a wireless-enabled device automatically tunes its transceiver to the frequency of the access point having the strongest signal. To support roaming of wireless-enabled devices, the device's radio periodically scans the airwaves and reassociates with the access point having the strongest signal.

An important concept to note regarding channel assignments is that the channel actually represents the center frequency that the transceiver within the wireless-enabled device's radio and access point uses (e.g., 2412 MHz for channel 1 and 2417 MHz for channel 2). As stated above, there is only a five MHz separation between the center frequencies. It is generally regarded that an 802.11b signal occupies at most 22 MHz of the frequency spectrum with about one half of the bandwidth falling on each side of the center frequency. As a result, an 802.11b signal overlaps with several adjacent channel frequencies. This leaves only three channels (channels 1, 6, and 11 for the U.S.) that can be used simultaneously without causing interference between access points. When channel assignments are made to access points in a residence or business, care must be taken so as to ensure that only non-overlapping channels (1, 6, and 11 in the U.S.) are assigned to access points that are within range of each other to avoid contention between access points and wireless-enabled devices. Although the 802.11b standard does not specifically require the use of only three channels for access points, the ramification of the 802.11b teachings is that only three channels are used.

A single WLAN access point is capable of accommodating a limited number of simultaneous users. The number of users that can be accommodated in an area can be increased by increasing the number of access points in that area. However, as explained above, 802.11b-compliant access points within range of each other must be assigned one of only three non-overlapping channels (1, 6, and 11). As such, it is generally considered not possible to locate more than three access points in a small area having a high user density. A solution to this problem is needed that would permit a higher density of users to use a WLAN for a given frequency range. More specifically, it would be desirable to implement a WLAN which permits a higher density of users for the ISM band.

BRIEF SUMMARY OF THE PREFERRED EMBODIMENTS OF THE INVENTION

The preferred embodiments of the present invention solve the problems noted above by a four channel wireless network channelization scheme particularly usable in the ISM frequency band between 2400 MHz and 2483.5 MHz. The preferred channelization scheme permits access points to be set to one of four frequencies in the ISM band, not three as indirectly required by the IEEE 802.11b standard. This channelization scheme takes advantage of the fact that only 20 MHz is typically needed between adjacent access point channels, not 25 MHz as is taught by the 802.11b standard. With four channels to choose from, a higher density of access points can be located thereby accommodating a higher density of users.

In accordance with one embodiment of the invention, the channelization scheme permits each access point to be set to a carrier frequency selected from a group of four frequencies consisting of a first frequency, a second frequency, a third frequency and a fourth frequency. The four frequencies are 2407 MHz, 2427 MHz, 2447 MHz and 2467 MHz, +/−0.062 MHz. The 0.062 MHz tolerance represents +/−25 parts per million with respect to the highest channel frequency (2467 MHz).

This choice of channel frequencies facilitates backward compatibility with the IEEE 802.11b standard. The upper three frequencies (2427, 2447 and 2467 MHz) correspond to three of the channels already defined by the 802.11b standard, namely, channels 4, 8 and 12. The lowest channel (2407 MHz) is not defined by the 802.11b standard and thus is added to provide four channels.

With four channels, a higher density of users in a given area can be accommodated. Further still, the particular choice of channel frequencies described herein permits an equal amount of power to be transmitted on all four channels. These and other aspects of the preferred embodiments of the present invention will become apparent upon analyzing the drawings, detailed description and claims, which follow.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, wireless device manufacturers may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical or wireless connection. Thus, if a first device couples to a second device, that connection may be through a direct electrical or wireless connection, or through an indirect electrical or wireless connection via other devices and connections. To the extent that any term is not specially defined in this specification, the intent is that the term is to be given its plain and ordinary meaning.

DETAILED DESCRIPTION OF THE PREFERRED EMBODIMENTS

Figure 1:
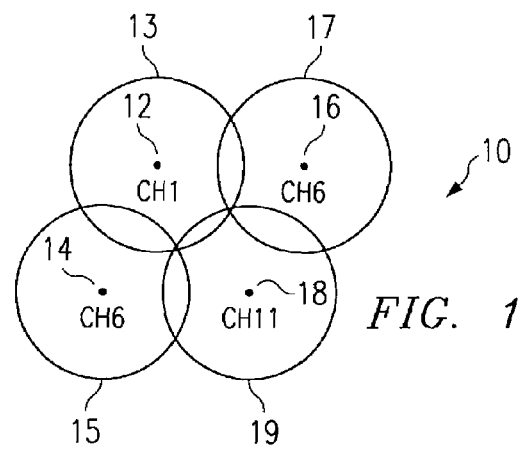
FIG. 1 shows a wireless local area network configuration comprising a plurality of access points within range of each other assigned to non-overlapping channels.
Figure 2:
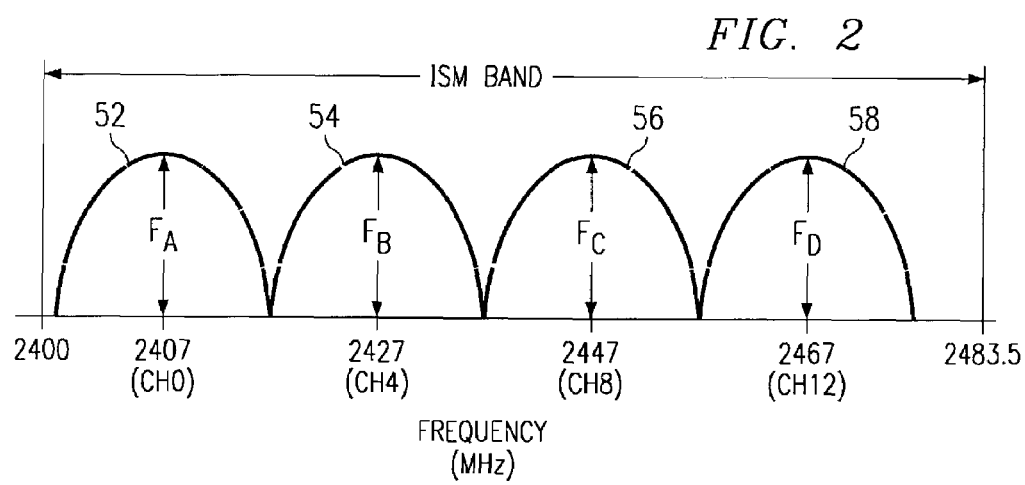
FIG. 2 shows a preferred embodiment of a channelization scheme in which four channels are positioned in the ISM frequency band.

Referring now to FIG. 2, the ISM band 50 is shown as the frequencies between 2400 MHz and 2483.5 MHz. In accordance with the preferred embodiment, a channelization scheme is implemented in which four channels 52, 54, 56, and 58 are included within the 83.5 MHz wide ISM band 50. The arcing humps in FIG. 2 generally represent the power spectral density associated with each channel. The channels 52-58 are centered on frequencies $F_A$-$F_D$, respectively. The frequencies $F_A$-$F_D$ preferably are spaced exactly, or at least approximately, 20 MHz apart. With a 20 MHz spacing between channels, four channels advantageously can be included within the ISM band, thereby permitting four access points to be located within range of each other. Although 25 MHz is typically allocated for IEEE 802.11b signals, only 20 MHz, or less, is usually actually needed.

Although four channels can be placed in the ISM band in a variety of different ways (i.e., frequency locations), the embodiment shown in FIG. 2 illustrates an optimal placement of the four channels. Table I below shows the frequencies for each channel.

TABLE I

| Center Frequencies | |
|---|---|
| Channel Frequency Designation | Frequency Range (MHz) |
| $F_A$ | 2407 +/− 0.062 |
| $F_B$ | 2427 +/− 0.062 |
| $F_C$ | 2447 +/− 0.062 |
| $F_D$ | 2467 +/− 0.062 |

Figure 3:
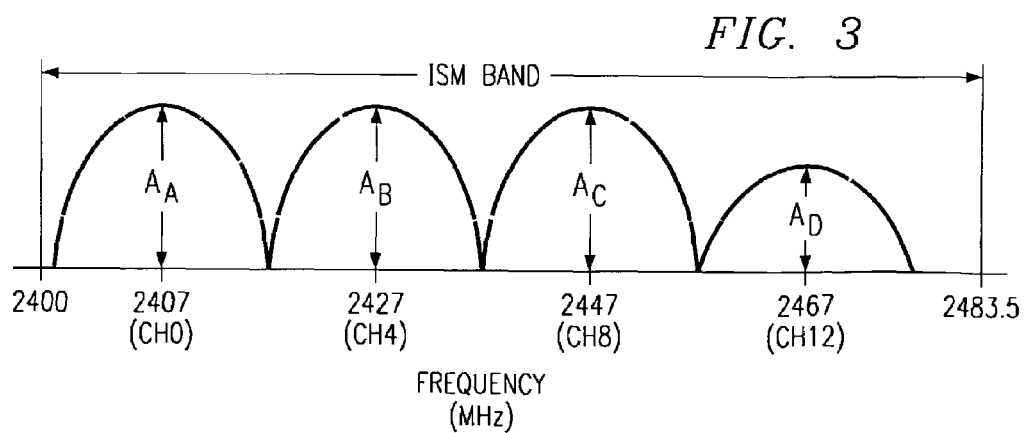
FIG. 3 depicts a non-optimal channelization scheme in which one channel cannot be used to transmit as much power as the other channels.

The tolerance on each channel frequency (0.062 MHz) represents +25 parts per million in relation to the highest frequency (2467 MHz) in accordance with conventional tolerance values. Thus, frequency $F_A$ is between 2406.938 MHz and 2407.062 MHz, inclusive. Similarly, frequencies $F_B$, $F_C$, and $F_D$ are inclusively between 2426.938 MHz and 2427.062 MHz, 2446.938 MHz and 2447.062 MHz, and 2466.938 MHz and 2467.062 MHz, respectively The four channel center frequencies chosen as indicated in Table I provides an optimal choice of frequencies for several reasons. First, the same amount of power can be transmitted across all four channels simultaneously. This amount of power is the highest possible for all possible arrangements of four equal bandwidth channels. In the U.S., the FCC restricts the use of the spectrum below 2390 MHz and above 2483.5 MHz, the so-called "forbidden zones." These restrictions mean that the power spectral densities associated with the lower most channel and the upper most channel must roll off quickly enough so that very little or no power is transmitted at frequencies in the forbidden zones. FIG. 3 illustrates what would happen if the channel frequencies were selected with the upper most frequency being too close to the upper forbidden zone above 2483.5 MHz. As shown, the amplitudes ($A_A$-$A_C$) of the power spectral densities of the lower three channels have approximately equal height. However, the channel at the highest frequency adjacent the forbidden zone above 2483.5 MHz is so close to the forbidden zone that its transmitted power must be reduced relative to the other three channels so that the power level at or greater than 2483.5 MHz complies with the FCC requirements. Thus, the amplitude of the fourth channel adjacent the upper forbidden zone is less than the amplitude of the power spectral densities associated with the other three channels (i.e., $A_D$ is less than $A_A$, $A_B$, and $A_C$). This implies that the coverage area for the small amplitude channel will be less than that of the other three channels.

The preferred embodiment shown in FIG. 2 also complies with other applicable FCC regulations, in addition to the forbidden zone restrictions described above. For example, for frequencies in the restricted bands above 960 MHz, the emissions from the intentional radiator shall not exceed a field strength of 500 microvolts per meter when measured at a distance of 3 meters. This restriction implies that the average radiated power is −41.25 dBmi in any one MHz band. The transmission duty cycle within a 100 millisecond period should also be considered when measuring the average radiated power.

Referring again to FIG. 2, in addition to enabling equal power transmission on all channels and compliance with the applicable regulatory considerations discussed above, the channelization scheme shown has another benefit. The upper three frequencies of the channelization set (i.e., 2427, 2447 and 2467 MHz) advantageously correspond to three frequencies set in the IEEE 802.11b standard. As noted above, that standard defines 14 frequencies beginning at 2412 MHZ and spaced at 5 MHz intervals. Those 14 frequencies are assigned 14 channel numbers (i.e., channel 1-14). As such, channels 4, 8 and 12 correspond to frequencies of 2427, 2447 and 2467 MHz, respectively. In accordance with a preferred embodiment of the invention, a new channel 0 is defined which corresponds to a frequency 5 MHz less than the frequency of channel 1. Channel 0 thus corresponds to a frequency of 2407 MHz. Accordingly, the specific channelization scheme depicted in FIG. 2 includes channels 0, 4, 8 and 12 in the 802.11b sense.

An additional benefit of the particular channelization scheme of FIG. 2 is that it provides for backward compatibility with respect to 802.11b devices. This means that the radio in a wireless device preferably is constructed so as to be tunable to one of the frequencies corresponding to the 14 802.11b channels as well as the newly defined channel 0 frequency, 2407 MHz. Such a device thus could be programmed to operate as an 802.11b device at channels 1, 6 and 11 as described above. This would be desirable in an 802.11b-only network or a mixed network that includes one or more devices only capable of the channel 1, 6, and 11 scheme. Also, radio circuits tunable to the 14 802.11b frequencies are well-known, available, and fully tested. Thus, implementing the preferred channelization scheme of FIG. 2 would be fairly straightforward in that only one new channel capability would have to be added (i.e., channel 0), as well as logic that can program the device to implement either the three channel channelization scheme of conventional 802.11b systems or the four channel channelization scheme described herein.

Thus, an improved wireless channelization scheme has been disclosed which permits access points to use one of four different channels instead of three as in conventional 802.11b wireless networks. The improved channelization scheme takes advantage of the fact that only 20 MHz is typically needed between adjacent access point channels, not 25 MHz as is taught by the 802.11b standard. With four channels to choose from, a higher density of access points can be located thereby accommodating a higher density of users.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A wireless network operating in the ISM frequency band between 2400 MHz and 2483.5 MHz, comprising:
   a plurality of access points to which wireless devices communicate;
   each access point programmable to a first channelization scheme and a second channelization scheme,
   wherein the first channelization scheme comprises a three channel channelization scheme in which no more than three access points operate within range of each other; and
   wherein for the second channelization scheme, each access point can be set to a carrier frequency selected from a group of four frequencies consisting of a first frequency, a second frequency, a third frequency and a fourth frequency,
   wherein, for the second channelization scheme, the first frequency is between 2406.938 MHz and 2407.062 MHz, inclusive, the second frequency is between 2426.938 MHz and 2427.062 MHz, inclusive, the third frequency is between 2446.938 MHz and 2447.062 MHz, inclusive, and the fourth frequency is between 2466.938 MHz and 2467.062 MHz, inclusive; wherein the wireless network is IEEE 802.11 based network;
   wherein, for the second channelization scheme, four access points can operate within range of each other.

2. The wireless network of claim 1 wherein the first frequency is 2407 MHz.

3. The wireless network of claim 1 wherein the second frequency is 2427 MHz.

4. The wireless network of claim 1 wherein the third frequency is 2447 MHz.

5. The wireless network of claim 1 wherein the fourth frequency is 2467 MHz.

6. The wireless network of claim 1 wherein the first frequency is 2407 MHz, the second frequency is 2427 MHz, the third frequency is 2447 MHz, and the fourth frequency is 2467 MHz.

7. The wireless network of claim 1 wherein the first channel channelization scheme comprises three channels each having a carrier frequency, the lowest carrier frequency of which is 2412 MHz.

8. The access point of claim 1 wherein the three channel channelization scheme comprises three channels each having a carrier frequency, the lowest carrier frequency for which is 2412 MHz.

9. An access point usable in a wireless network operating in the ISM frequency band between 2400 MHz and 2483.5 MHz, comprising:
   an antenna to permit communications with a wireless device; and
   an interface to a wire-based network;
   wherein the access point implements one of a three channel channelization scheme and a four channel channelization scheme, wherein for the four channel channelization scheme, the access point can be set to a carrier frequency selected from a group of four frequencies consisting of a first frequency, a second frequency, a third frequency and a fourth frequency;

wherein, for the four channel channelization scheme, the first frequency is between 2406.938 MHz and 2407.062 MHz, inclusive, the second frequency is between 2426.938 MHz and 2427.052 MHz, inclusive, the third frequency is between 2446.938 MHz and 2447.062 MHz, inclusive, and the fourth frequency is between 2466.938 MHz and 2467.062 MHz, inclusive; wherein the wireless network is IEEE 802.11 based network;

wherein, for the three channel channelization scheme, no more than three access points can operate within range of each other, and for the four channel channelization scheme, four access points can operate within range of each other.

10. The access point of claim 9 wherein the first frequency is 2407 MHz.

11. The access point of claim 9 wherein the second frequency is 2427 MHz.

12. The access point of claim 9 wherein the third frequency is 2447 MHz.

13. The access point of claim 9 wherein the fourth frequency is 2467 MHz.

14. The access point of claim 9 wherein the first frequency is 2407 MHz, the second frequency is 2427 MHz, the third frequency is 2447 MHz, and the fourth frequency is 2467 MHz.

15. A communication device, comprising:
  means for programming the communication device to operate in accordance with a three or a four channel channelization scheme;
  wherein for the four channel channelization scheme, a carrier frequency is selected from a group of four frequencies consisting of a first frequency, a second frequency, a third frequency and a fourth frequency;
  wherein, for the four channel channelization scheme, the first frequency is between 2406.938 MHz and 2407.062 MHz, inclusive, the second frequency is between 2426.938 MHz and 2427.062 MHz, inclusive, the third frequency is between 2446.938 MHz and 2447.062 MHz, inclusive, and the fourth frequency is between 2466.938 MHz and 2467.062 MHz, inclusive; wherein the communication device is configured to operate in IEEE 802.11 based wireless networks;
  wherein, for the three channel channelization scheme, no more than three communication devices can operate within range of each other, and for the four channel channelization scheme, four communication devices can operate within range of each other.

16. The communication device of claim 15 wherein the first frequency is 2407 MHz.

17. The communication device of claim 15 wherein the second frequency is 2427 MHz.

18. The communication device of claim 15 wherein the third frequency is 2447 MHz.

19. The communication device of claim 15 wherein the fourth frequency is 2467 MHz.

20. The communication device of claim 15 wherein the first frequency is 2407 MHz, the second frequency is 2427 MHz, the third frequency is 2447 MHz, and the fourth frequency is 2467 MHz.

* * * * *